(12) United States Patent
Wang et al.

(10) Patent No.: US 8,660,606 B2
(45) Date of Patent: Feb. 25, 2014

(54) PROMPT METHOD FOR DETACHABLE ELEMENT, MOBILE ELECTRONIC DEVICE USING DETACHABLE ELEMENT AND COMPUTER-READABLE MEDIUM THEREOF

(75) Inventors: Chih-Kuang Wang, Taoyuan County (TW); Hsiang-Tai Huang, Taoyuan County (TW); Hsi-Kun Chen, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 96 days.

(21) Appl. No.: 13/087,380

(22) Filed: Apr. 15, 2011

(65) Prior Publication Data

US 2012/0264458 A1  Oct. 18, 2012

(51) Int. Cl.
*H04M 1/00* (2006.01)
*H04B 7/00* (2006.01)
*H04M 11/00* (2006.01)
*H04W 24/00* (2009.01)
*H04B 1/38* (2006.01)
*G06F 3/033* (2013.01)

(52) U.S. Cl.
USPC .... 455/556.2; 455/66.1; 455/421; 455/456.1; 455/90.1; 345/179

(58) Field of Classification Search
USPC ......... 455/457, 90.1, 456.1, 421, 66.1, 556.1, 455/556.2; 345/179
See application file for complete search history.

(56) References Cited

U.S. PATENT DOCUMENTS

| | | | |
|---|---|---|---|
| 2004/0085209 A1* | 5/2004 | Schmidt et al. | 340/573.4 |
| 2007/0063994 A1 | 3/2007 | Carlson et al. | |
| 2008/0139246 A1 | 6/2008 | Michinaka | |
| 2009/0295573 A1 | 12/2009 | Lee | |
| 2010/0216487 A1* | 8/2010 | Yamaguchi | 455/456.1 |

FOREIGN PATENT DOCUMENTS

| | | |
|---|---|---|
| CN | 1980433 | 6/2007 |
| CN | 101471989 | 7/2009 |

OTHER PUBLICATIONS

"Extended Search Report of Europe Counterpart Application", issued on Oct. 17, 2011, p. 1-p. 8, in which the listed references were cited.
"Office Action of China Counterpart Application", issued on Dec. 3, 2013, p. 1-p. 8, in which the listed references were cited.

* cited by examiner

*Primary Examiner* — Christopher M Brandt
(74) *Attorney, Agent, or Firm* — Jianq Chyun IP Office

(57) ABSTRACT

A prompt method for a detachable element, a mobile electronic device using the detachable element and a computer-readable medium thereof are provided. The method comprises recording environmental information when detecting the detachable element is detached from the mobile electronic device. The method also includes determining whether the mobile electronic device conforms to a prompt condition according to the environmental information. The method further includes performing a prompt operation when the mobile electronic device conforms to the prompt condition.

20 Claims, 8 Drawing Sheets

PROMPT METHOD FOR DETACHABLE ELEMENT, MOBILE ELECTRONIC DEVICE USING DETACHABLE ELEMENT AND COMPUTER-READABLE MEDIUM THEREOF

BACKGROUND OF THE INVENTION

1. Field of the Invention

The invention relates to a prompt method, a mobile electronic device and a computer-readable medium. Particularly, the invention relates to a prompt method for a detachable element, a mobile electronic device executing the method and a computer-readable medium.

2. Description of Related Art

In recent years, with continuous evolution and amelioration of electronic technology and communication techniques, mobile electronic devices such as mobile phones, personal digital assistants (PDAs) and laptop computers, etc. are continually developed. In today's era of information explosion, these mobile electronic devices are indispensable in people's daily life, which can be used to implement various functions such as message transmission, Internet accessing, document processing and entertainment, etc.

To facilitate utilization, these mobile electronic devices are generally equipped with detachable peripheral elements, for example, the mobile electronic device may have a detachable stylus, and the user can directly fetch the stylus from the mobile electronic device to write on a screen, or the mobile electronic device may have a plug-in memory card to facilitate the user fetching the memory card from the mobile electronic device to store data therein to the other electronic products, so as to exchange data and files between different electronic products.

However, when the user fetches the detachable element such as the stylus or the memory card from the mobile electronic device, after the utilization, the user probably forgets to put back the stylus or the memory card to the mobile electronic device. For example, during a meeting, the user fetches a memory card of a mobile phone and accesses data stored therein through a public computer used in the meeting, though after the meeting, the user forgets to take back the memory card, and until a next utilization, the user may discover that the detachable element has been taken out, and now it is difficult to find the detachable element due to lack of related information.

SUMMARY OF THE INVENTION

Accordingly, the invention is directed to a prompt method for a detachable element, which can prompt a user related information about the detachable element is detached from a mobile electronic device.

The invention is directed to a mobile electronic device using a detachable element, which is capable of recording related information when the detachable element of the mobile electronic device is detached from the mobile electronic device and prompting a user appropriately.

The invention is directed to a computer-readable medium, the program instruction therein is loaded to a mobile electronic device to record related information of a detachable element and generate a prompt message.

The invention provides a prompt method for a detachable element, which is adapted to a mobile electronic device, where the detachable element is detachably connected to the mobile electronic device. The method comprises recording environmental information when detecting that the detachable element is detached from the mobile electronic device. The method also includes determining whether the mobile electronic device conforms to a prompt condition according to the environmental information. The method further includes performing a prompt operation related to the detachable element when the mobile electronic device conforms to the prompt condition.

In an embodiment of the invention, the environmental information comprises location information. The step of determining whether the mobile electronic device conforms to the prompt condition according to the environmental information comprises determining whether a current location of the mobile electronic device exceeds a predetermined distance range according to the location information, and determining that the mobile electronic device conforms to the prompt condition when the current location of the mobile electronic device exceeds the predetermined distance range and the detachable element is not connected to the mobile electronic device.

In an embodiment of the invention, the location information corresponds to one or a combination of global positioning system (GPS) positioning data, a wireless communication signal strength and calendar data corresponding to the mobile electronic device when the detachable element is detached from the mobile electronic device.

In an embodiment of the invention, the environmental information includes time information, and the step of determining whether the mobile electronic device conforms to the prompt condition according to the environmental information comprises determining whether a time that the detachable element is not connected to the mobile electronic device reaches a time threshold according to the time information, and determining that the mobile electronic device conforms to the prompt condition when the time that the detachable element is not connected to the mobile electronic device reaches the time threshold.

In an embodiment of the invention, the time information corresponds to one or a combination of a current time when the detachable element is detached from the mobile electronic device and calendar data.

In an embodiment of the invention, the prompt operation includes displaying a prompt frame to prompt that the detachable element is not connected to the mobile electronic device.

In an embodiment of the invention, after the step of performing the prompt operation related to the detachable element, the method further comprises displaying the environmental information when a first type signal is received, and again performing the prompt operation after a specific time in accordance with a second type signal when the second type signal is received.

In an embodiment of the invention, the prompt method of the detachable element further comprises obtaining a multimedia input to serve as the environmental information when detecting that the detachable element is detached from the mobile electronic device.

According to another aspect, the invention provides a mobile electronic device using a detachable element, which includes a connection unit, a detection module and a processing module. The detachable element is detachably connected to the mobile electronic device through the connection unit. The detection module is coupled to the connection unit, and detects whether the detachable element is detached from the mobile electronic device. The processing module is coupled to the detection module, and when the detection module detects that the detachable element is detached from the mobile electronic device, the processing module records environmental information, and determines whether the mobile electronic device conforms to a prompt condition according to the environmental information. When the mobile electronic device conforms to the prompt condition, the processing module performs a prompt operation related to the detachable element.

In an embodiment of the invention, the environmental information comprises location information and/or time information. When the environmental information comprises the location information, the processing module determines whether a current location of the mobile electronic device exceeds a predetermined distance range according to the location information. When the current location of the mobile electronic device exceeds the predetermined distance range and the detachable element is not connected to the mobile electronic device, the processing module determines that the mobile electronic device conforms to the prompt condition. Moreover, when the environmental information comprises the time information, the processing module determines whether a time that the detachable element is not connected to the mobile electronic device reaches a time threshold according to the time information, and when the time that the detachable element is not connected to the mobile electronic device reaches the time threshold, the processing module determines that the mobile electronic device conforms to the prompt condition.

In an embodiment of the invention, the mobile electronic device further includes a global positioning system (GPS) module coupled to the processing module. The processing module obtains GPS positioning data of the mobile electronic device through the GPS module when the detection module detects that the detachable element is detached from the mobile electronic device, and records the location information according to the GPS positioning data.

In an embodiment of the invention, the mobile electronic device further comprises a wireless communication module coupled to the processing module. The processing module obtains a wireless communication signal strength through the wireless communication module when the detection module detects that the detachable element is detached from the mobile electronic device, and records the location information according to the wireless communication signal strength.

In an embodiment of the invention, the mobile electronic device further includes a storage unit coupled to the processing module. The processing module obtains calendar data from the storage unit when the detection module detects that the detachable element is detached from the mobile electronic device, and records the location information and/or the time information according to the calendar data.

In an embodiment of the invention, the mobile electronic device further includes a time module coupled to the processing module. The processing module obtains a current time through the time module when the detection module detects that the detachable element is detached from the mobile electronic device, and records the time information according to the current time.

In an embodiment of the invention, the mobile electronic device further includes a display unit coupled to the processing module. The processing module controls the display module to display a prompt frame to prompt that the detachable element is not connected to the mobile electronic device.

In an embodiment of the invention, after the processing module performs the prompt operation related to the detachable element, the processing module controls the display unit to display the environmental information when receiving a first type signal.

In an embodiment of the invention, after the processing module performs the prompt operation related to the detachable element, when the processing module receives a second type signal, the processing module again performs the prompt operation after a specific time in accordance with the second type signal.

In an embodiment of the invention, the mobile electronic device further includes a multimedia module coupled to the processing module. The processing module obtains a multimedia input through the multimedia module to serve as the environmental information when the detection module detects that the detachable element is detached from the mobile electronic device.

According to another aspect, the invention provides a computer-readable medium. The computer-readable medium records at least one program instruction, and after the at least one program instruction is loaded into a mobile electronic deice using a detachable element, following steps are executed: recording environmental information when detecting that the detachable element is detached from the mobile electronic device; determining whether the mobile electronic device conforms to a prompt condition according to the environmental information; and performing a prompt operation related to the detachable element when the mobile electronic device conforms to the prompt condition.

According to the above descriptions, the environmental information when the detachable element is detached from the mobile electronic device is recorded, and the environmental information is used to prompt the user when it is determined that the detachable element is not put back to the mobile electronic device for a long time, or when the detachable element is too far away from the mobile electronic device and is not put back to the mobile electronic device. In this way, a chance that the user forgets to put back the detachable element to the mobile electronic device is decreased.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
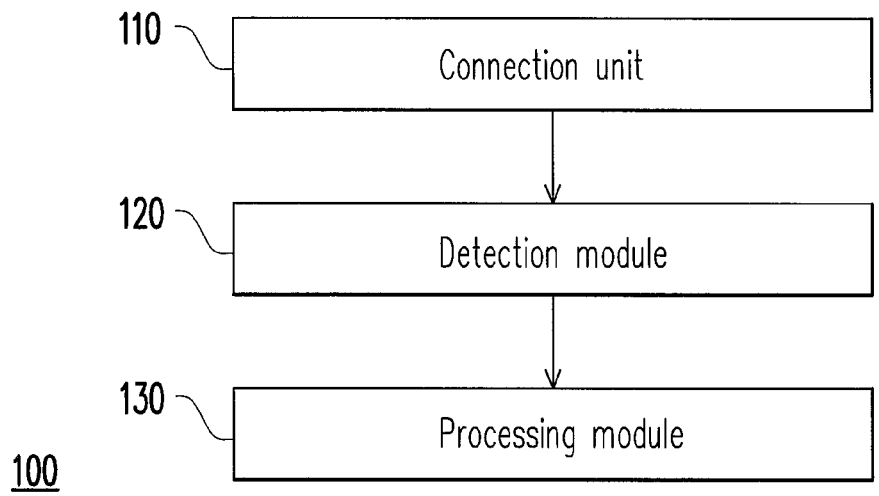
FIG. 1 is a block diagram of a mobile electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a mobile electronic device according to an embodiment of the invention. Referring to FIG. 1, the mobile electronic device 100 of the present embodiment is, for example, a mobile phone, a smart phone, a personal digital assistant (PDA), a laptop computer, a tablet personal computer or an e-book, etc. The mobile electronic device 100 includes at least one detachable element (not shown), and a user can detach the detachable element from the mobile electronic device 100, and can also put the detachable element back to the mobile electronic device 100, where the detachable element may be a stylus, a memory card, a laser pen, a microphone, a backup battery, a remote controller and a flash, etc., though the invention is not limited thereto. In the present embodiment, the mobile electronic device 100 includes a connection unit 110, a detection module 120 and a processing module 130. The detection module 120 is coupled to the connection unit 110, and the processing module 130 is coupled to the detection module 120, and functions of each unit are described as follows.

The detachable element of the mobile electronic device 100 is detachably connected to the mobile electronic device 100 through the connection unit 110. For example, if the detachable element is a memory card, the connection unit 110 is then a memory card slot. The memory card is, for example, a secure digital (SD) card or other types of memory card, which is adapted to be inserted into the memory card slot. In other words, the connection unit 110 is hardware equipment designed corresponding to the detachable element.

The detection module 120 is used to detect whether the detachable element is detached from the mobile electronic device 100. Assuming that the detachable element is a memory card, the detection module 120 is, for example, a memory card detection circuit. The memory card detection circuit can be configured to a gold finger in the memory card slot to detect whether the memory card is detached from the memory card slot or inserted into the memory card slot.

The processing module 130 may be implemented by software, hardware, or a combination thereof, which is not limited by the invention. The software is, for example, an operating system, application software or a driving program, etc. The hardware is, for example, a central processing unit (CPU), a programmable general purpose or special purpose microprocessor, or a digital signal processor (DSP), etc. The processing module 130 is used to prompt the user related information of the detachable element according to a detection result of the detection module 120.

Figure 2:
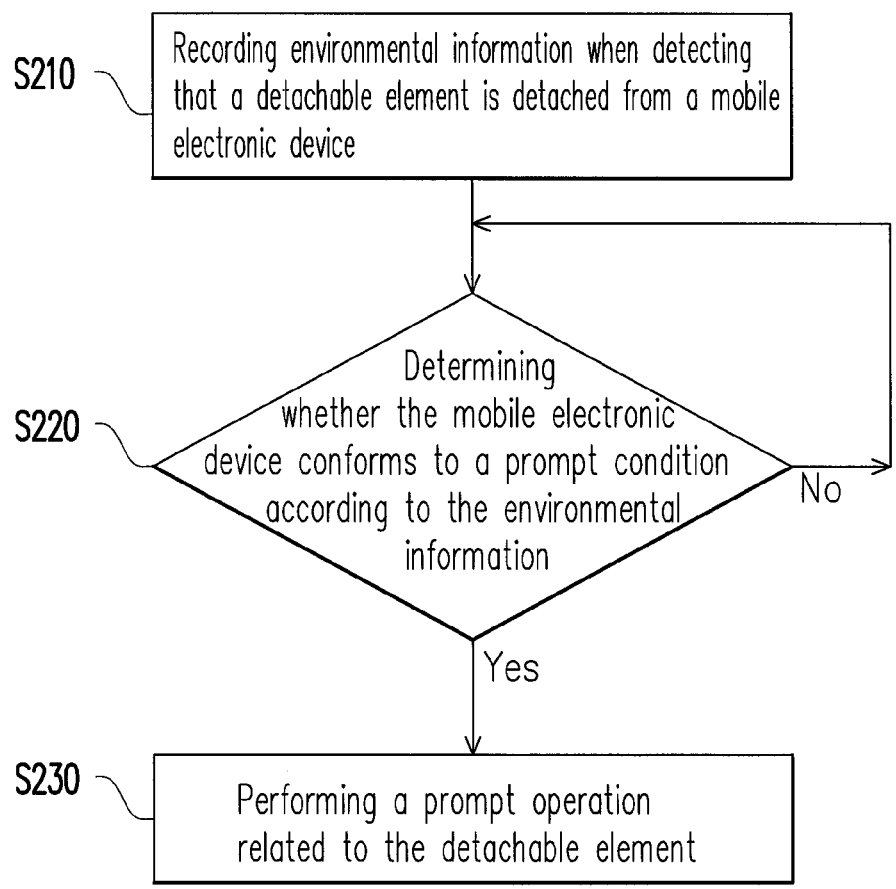
FIG. 2 is a flowchart illustrating a prompt method for a detachable element according to an embodiment of the invention.

FIG. 2 is a flowchart illustrating a prompt method for a detachable element according to an embodiment of the invention. For clarity's sake, detailed steps of the prompt method for the detachable element are described with reference of various components of the mobile electronic device 100.

Referring to FIG. 1 and FIG. 2, in the present embodiment, a detachable element of the mobile electronic device 100 is connected to the mobile electronic device 100 through the connection unit 110. When the user detaches the detachable element from the mobile electronic device 100, in step S210, the detection module 120 detects that the detachable element is detached from the mobile electronic device 100, and now the processing module 130 records current environmental information of the mobile electronic device 100, wherein the environmental information includes location information, time information or a combination of the location information and the time information, etc., though the invention is not limited thereto.

In step S220, the processing module 130 repeatedly determines whether the mobile electronic device 100 conforms to a prompt condition according to the environmental information. When the processing module 130 determines that the mobile electronic device 100 conforms to the prompt condition, in step S230, the processing module 130 performs a prompt operation related to the detachable element. For example, the prompt operation includes displaying a prompt frame on a display unit (not shown) of the mobile electronic device 100, sending an alert tone or vibrating, etc., and any method that can remind the user that the detachable element is not put back to the mobile electronic device 100 can serve as the prompt operation, which is not limited by the invention.

Figure 3:
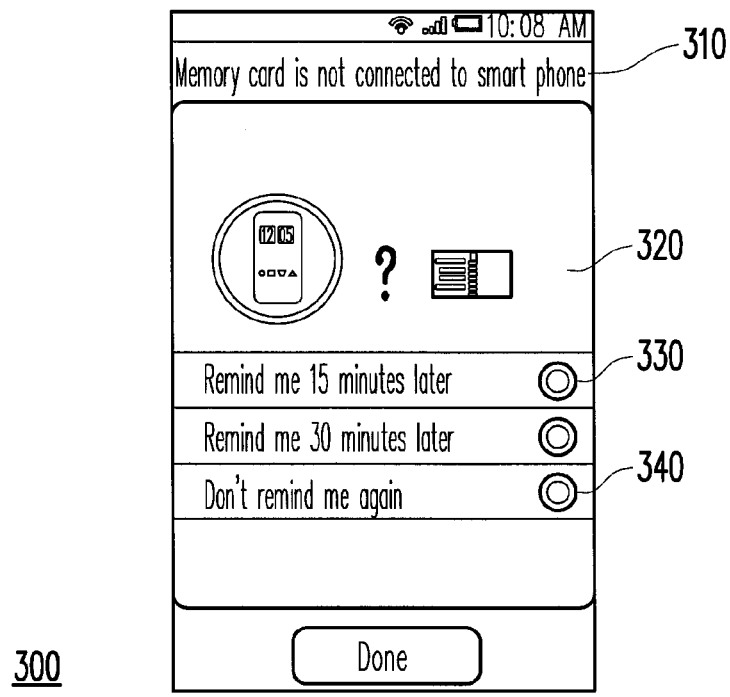
FIG. 3 is a schematic diagram of a prompt frame according to an embodiment of the invention.

It is assumed that the mobile electronic device 100 is a smart phone, the detachable element is a memory card, and the prompt operation performed by the processing module 130 is to display a prompt frame, FIG. 3 is a schematic diagram of a prompt frame according to an embodiment of the invention. Referring to FIG. 3, the prompt frame 300 includes a prompt text 310 and a prompt image 320 to clearly inform the user that the memory card is not connected to the smart phone. In the present embodiment, the prompt frame 300 further provides options to facilitate the user selecting a subsequent operation, for example, the user may select to again display the prompt frame 300 after a specific time.

In detail, the user triggers a second type signal by clicking an effective region (for example, an effective region 330) on the prompt frame 300, and after the processing module 130 receives the second type signal, it correspondingly displays the prompt frame 300 after 15 minutes. It should be noticed that in other embodiments, the user may also trigger the second type signal by clicking a hardware button or other software buttons of the mobile electronic device 100. If the user has confirmed this message and determines that it is unnecessary to receive the prompt, the user may directly select an effective region 340 to inform the processing module 130 of not displaying the prompt frame 300 again.

It should be noticed that the environmental information is obtained and recorded by the processing module 130, which is not provided by the detachable element. In other words, it is unnecessary to add an additional hardware device to the detachable element, and the processing module 130 is able to perform the prompt operation when determining that the mobile electronic device 100 conforms to the prompt condition. Since the environmental information includes the location information and/or the time information, etc., in order to describe how the processing module 130 determines whether the mobile electronic device 100 conforms to the prompt condition according to different environmental information, different embodiments are provided below for detail descriptions.

Figure 4:
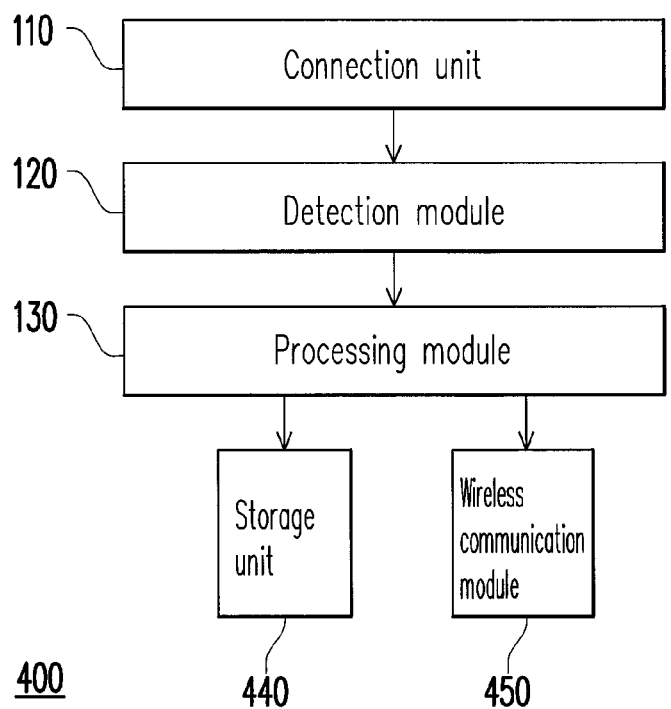
FIG. 4 is a block diagram of a mobile electronic device according to another embodiment of the invention.
Figure 5:
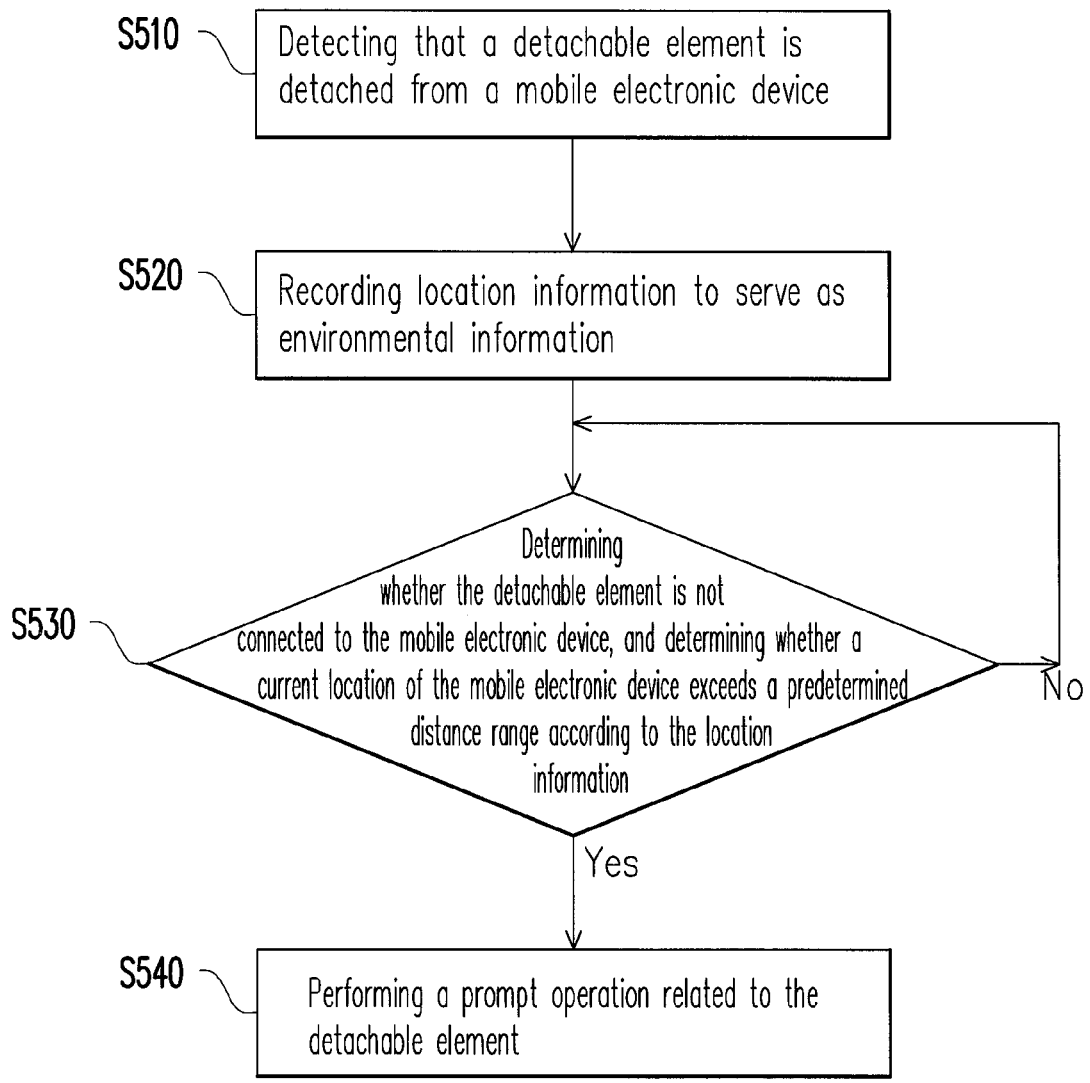
FIG. 5 is a flowchart illustrating a prompt method for a detachable element according to another embodiment of the invention.

FIG. 4 is a block diagram of a mobile electronic device according to another embodiment of the invention, and FIG. 5 is a flowchart illustrating a prompt method for a detachable element according to another embodiment of the invention. Referring to FIG. 4 and FIG. 5, in the present embodiment, besides the connection unit, 110, the detection unit 120 and the processing module 130, the mobile electronic device 400 further includes a storage unit 440 and a wireless communication module 450, which are respectively coupled to the processing module 130.

The storage unit 440 may be a memory, a hard disc or other similar devices that is used to store various data of the mobile electronic device 400. Moreover, the wireless communication module 450 is, for example, a second generation telecommunication (2G) module, a third generation telecommunication (3G) module, a wireless fidelity (Wi-Fi) module, or a worldwide interoperability for microwave access (WiMAX) module, etc.

First, in step S510, when the user detaches the detachable element from the connection unit 110, the detection module 120 detects that the detachable element is detached from the mobile electronic device 400. Then, in step S520, the processing module 130 obtains current location information of the mobile electronic device 400 to serve as the environmental information, and records the location information into the storage unit 440.

For example, the processing module 130 obtains a wireless communication signal strength through the wireless communication module 450, and obtains and records the location information according to the wireless communication signal strength. Assuming the wireless communication module 450 is a 3G module, the processing module 130 may determine a 3G base station where the mobile electronic device 400 is located within a signal coverage range thereof according to location information of the 3G base station and a current 3G signal strength, so as to obtain the location information.

In another embodiment, the storage unit 440 stores calendar data edited by the user, and since the calendar data generally records a daily schedule of the user of the mobile electronic device 400 (e.g., time and location of a conference, etc.), the processing module 130 may take a conference location recorded in the calendar data corresponding to a time when the detachable element is detached as the location information.

In another embodiment, the mobile electronic device 400 further includes a global positioning system (GPS) module (not shown) coupled to the processing module 130, and the processing module 130 may obtain GPS positioning data of the mobile electronic device 100 through the GPS module, and record the location information according to the GPS positioning data. For example, the GPS module may be a GPS device, which is used for receiving satellite signals to calculate location information such as latitude and longitude or altitude of the mobile electronic device 400, and the processing module 130 may process and record above information to serve as the environmental information.

It should be noticed that the processing module 130 may obtain the location information according to a combination of the aforementioned information. For example, when the detachable element is detached from the mobile electronic device 300, the processing module 130 may compare the current location information provided by the GPS module with the conference location recorded in the calendar data, and if the two location information are matched or close, a reference value of the location information serving as the environmental information is increased.

After the location information is recorded, in step S530, the processing module 130 determines whether the detachable element is not connected to the mobile electronic device 400 according to information provided by the detection module 120, and the processing module 130 determines whether a current location of the mobile electronic device 400 exceeds a predetermined distance range according to the above location information. The predetermined distance range may be set as an actual distance (for example, 1 kilometer, though the invention is not limited thereto) by the user, or determined according to the signal coverage range of the base station (for example, a cellular cell radius of the base station) by the mobile electronic device 400.

For example, since the wireless communication module 450 keeps contacting the base station that provides services to the mobile electronic device 400, and when the detachable element is detached from the mobile electronic device 400, a base station (for example, a base station A) where the mobile electronic device 400 is located within the signal coverage range thereof is recorded, if the user carries the mobile electronic device 400 to the signal coverage range of another base station (for example, a base station B), the processing module 130 determines that the current location of the mobile electronic device 400 exceeds the predetermined distance range.

When the current location of the mobile electronic device 400 exceeds the predetermined distance range, in step S540, the processing module 130 performs a prompt operation related to the detachable element. Once the user detaches the detachable element from the mobile electronic device 400, the mobile electronic device 400 executes the steps shown in FIG. 5, so as to prompt the user when the user carries the mobile electronic device 400 to a location outside the predetermined distance range and the detachable element is not put back to the mobile electronic device 400.

Figure 6:
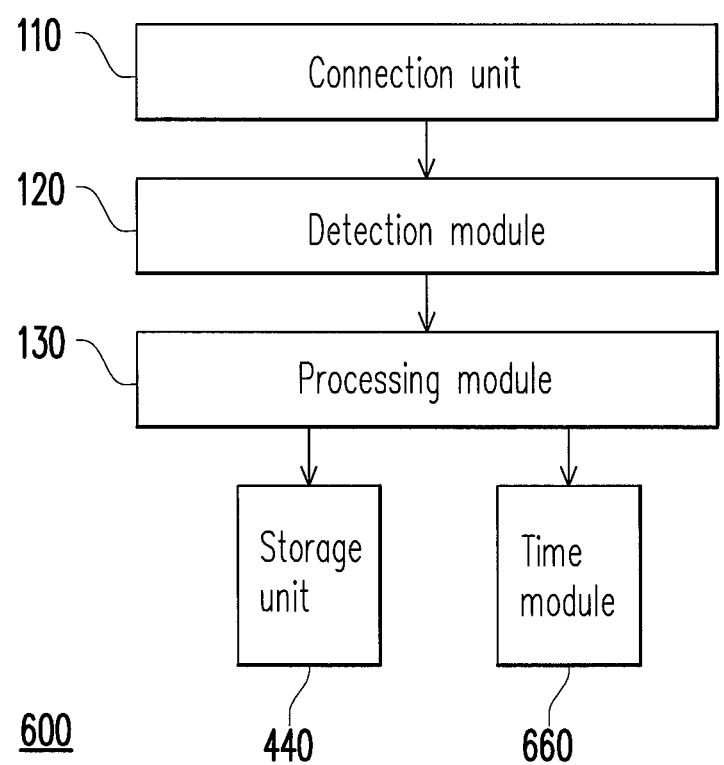
FIG. 6 is a block diagram of a mobile electronic device according to still another embodiment of the invention.

FIG. 6 is a block diagram of a mobile electronic device according to still another embodiment of the invention. In the present embodiment, besides the connection unit 110, the detection module 120, the processing module 130 and the storage unit 440, the mobile electronic device 600 further includes a time module 660 coupled to the processing module 130. The time module 660 generates time information and provides the time information to the processing module 130 for utilization.

Figure 7:
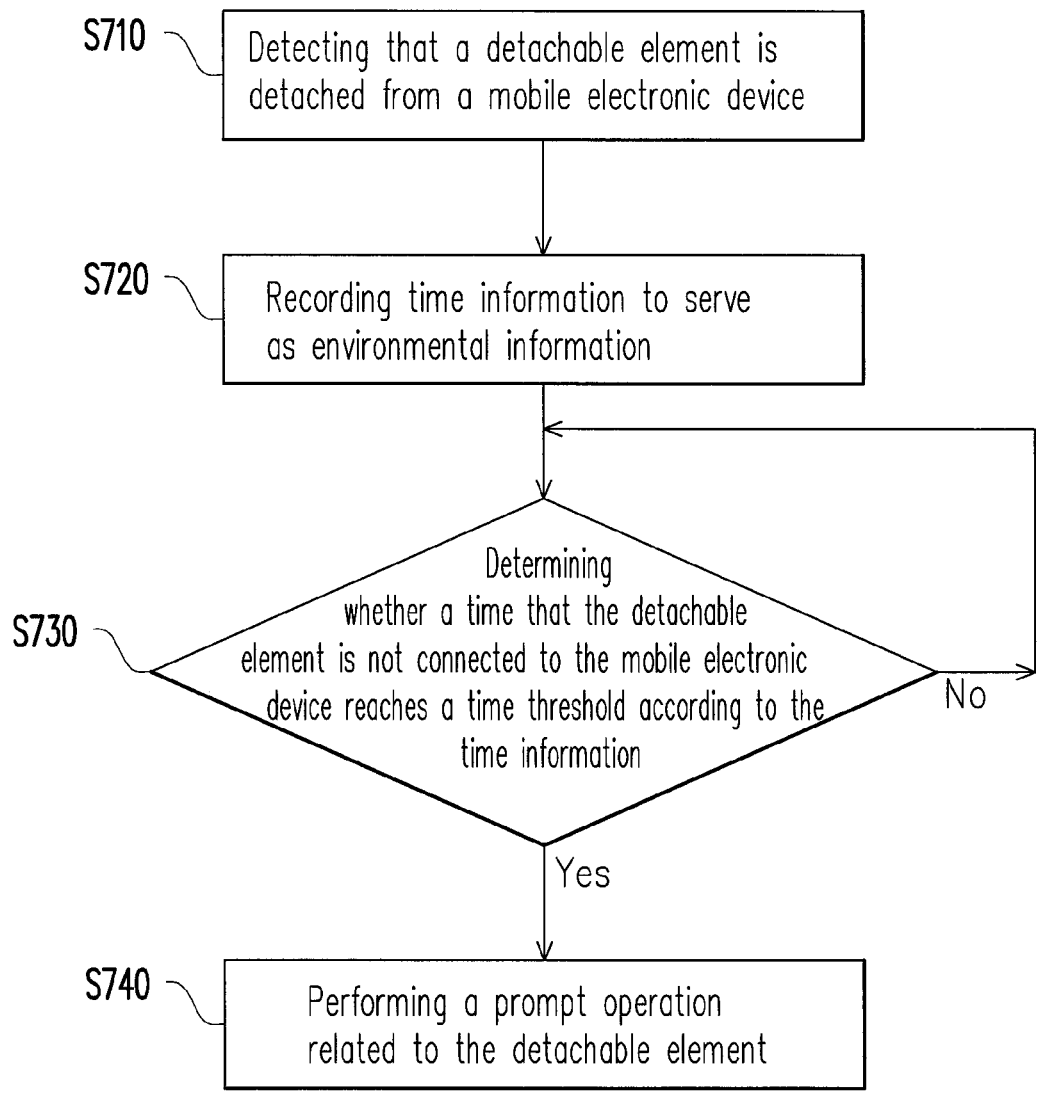
FIG. 7 is a flowchart illustrating a prompt method for a detachable element according to still another embodiment of the invention.

FIG. 7 is a flowchart illustrating a prompt method for a detachable element according to still another embodiment of the invention. Referring to FIG. 6 and FIG. 7, when the user detaches the detachable element from the mobile electronic device 600, in step S710, the detection module 120 detects that the detachable element is detached from the mobile electronic device 600. In step S720, the processing module 130 records time information provided by the time module 660 as the environmental information.

In detail, when the detection module 120 detects that the detachable element is detached from the mobile electronic device 600, the processing module 130 obtains a current time through the time module 660, and records the time information according to the current time. Moreover, the processing module 130 may also obtain the time information according to the calendar data stored in the storage unit 440. Generally, the user usually notes a start time and an end time of an event (for example, a start time and an end time of a conference or dinner, etc.) in the calendar data, so that information related to time in the calendar data can be used as a reference when the processing module 130 records the time information.

Then, in step S730, the processing module 130 determines whether a time that the detachable element is not connected to the mobile electronic device 600 reaches a time threshold according to the time information. When the time that the detachable element is not connected to the mobile electronic device 600 reaches the time threshold, the processing module 130 determines that the mobile electronic device 600 conforms to the prompt condition, and in step S740, the processing module 130 performs the prompt operation related to the detachable element, for example, controls a display unit (not shown) of the mobile electronic device 600 to display a prompt frame to prompt the user that the time that the detachable element is not connected to the mobile electronic device 600 has reached the time threshold.

Figure 8:
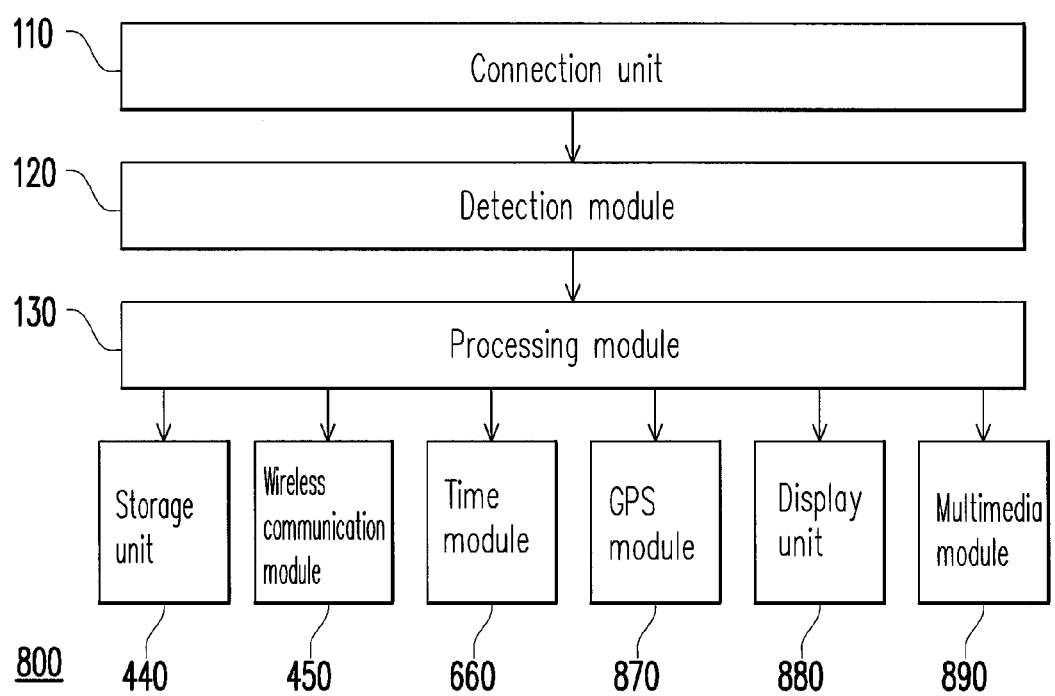
FIG. 8 is a block diagram of a mobile electronic device according to yet another embodiment of the invention.

Another embodiment is provided below for description. FIG. 8 is a block diagram of a mobile electronic device according to yet another embodiment of the invention. The mobile electronic device 800 of the present embodiment includes the connection unit 110, the detection module 120, the processing module 130, the storage unit 440 coupled to the processing module 130, the wireless communication module 450, the time module 660, a GPS module 870, a display unit 880 and a multimedia module 890. Besides the multimedia module 890, the other components have been described in the aforementioned embodiments, so that detailed descriptions thereof are not repeated.

In the present embodiment, the multimedia module 890 may include any device capable of recording sounds, capturing pictures and capturing video images such as a microphone, a camera or a video camera, etc. A detailed operation method of the mobile electronic device 800 is described below with reference of FIG. 9.

Figure 9:
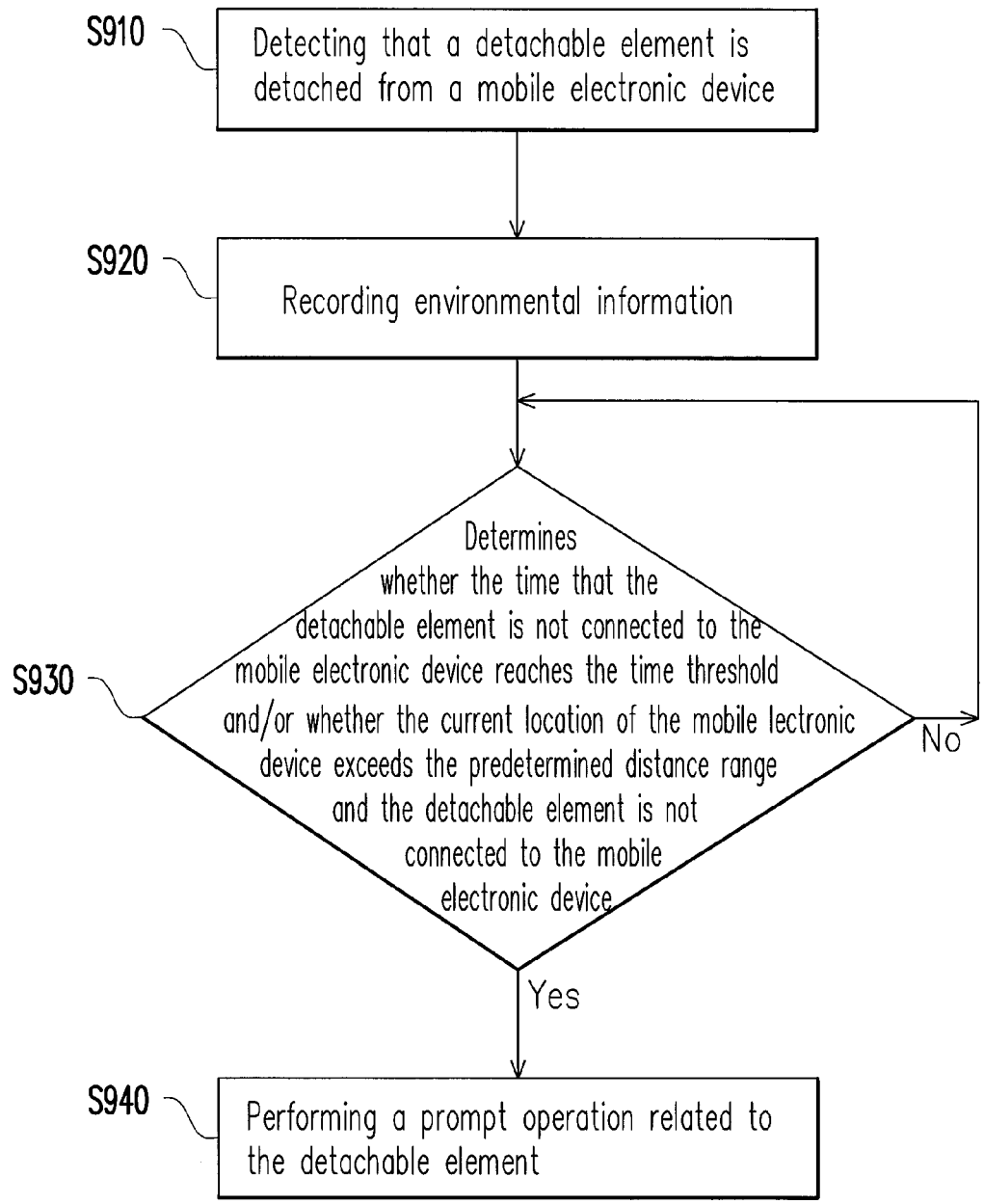
FIG. 9 is a flowchart illustrating a prompt method for a detachable element according to yet another embodiment of the invention.

Referring to FIG. 8 and FIG. 9, when the user detaches the detachable element from the mobile electronic device 800, in step S910, the detection module 120 detects that the detachable element is detached from the mobile electronic device 800. In step S920, the processing module 130 records current environmental information of the mobile electronic device 800. In detail, besides that the processing module 130 may obtain the time information through the storage unit 440 and/or the time unit 660 and obtain the location information through one of the storage unit 440, the wireless communication module 450 and the GPS module 870 or the combination thereof to serve as the environmental information, in the present embodiment, the processing module 130 may also control the multimedia module 890 to obtain a multimedia input to serve as the environmental information. For example, the processing module 130 activates the multimedia module 890 to capture surrounding pictures or video images corresponding to a time when the detachable element is detached from the mobile electronic device 800, or request the user to record a segment of sound. The above environmental information is recorded in the storage unit 440.

In step S930, the processing module 130 repeatedly determines whether the time that the detachable element is not connected to the mobile electronic device 800 reaches the time threshold and/or whether the current location of the mobile electronic device 800 exceeds the predetermined distance range when the detachable element is not connected to the mobile electronic device 800. Since the determination methods are the same as that described in the aforementioned embodiments, detailed descriptions thereof are not repeated.

If the determination result of the step S930 is affirmative, in step S940, the processing module 830 performs the prompt operation related to the detachable element. In the present embodiment, the prompt operation includes displaying a prompt frame, and the prompt frame further provides options to facilitate the user selecting a subsequent operation. For example, the user can click a specific option in the prompt frame or touch a software key or a hardware key of the mobile electronic device 800 to trigger a first type signal. When the processing module 130 receives the first type signal, the processing module 130 controls the display unit 880 to display the environmental information recorded in the storage unit 440.

Figure 10:
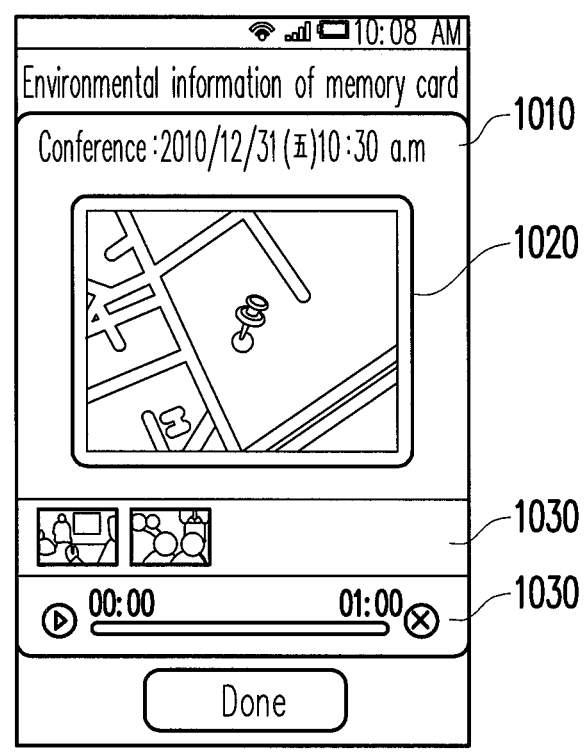
FIG. 10 is a schematic diagram displaying environmental information according to yet another embodiment of the invention.

FIG. 10 is a schematic diagram of displaying environmental information according to yet another embodiment of the invention. Referring to FIG. 10, the environmental information displayed when the processing module 130 receives the first type signal includes conference time information 1010, location information 1020 displayed in a map form and video/audio information 1030. The user can recall a scene when the detachable element is detached according to the displayed environmental information, so as to facilitate remembering a location that the detachable element is possibly placed.

The invention provides a computer-readable medium. The computer-readable medium records a plurality of program instructions, and after the program instructions are loaded into a mobile electronic device, the aforementioned prompt method for a detachable element is executed on the mobile electronic device. The computer-readable medium may be any data storage device (including a read only memory (ROM), a random access memory (RAM), a tape, a floppy disc, a hard disc, an optical disc and transmission media, etc.), which is not limited by the invention.

In summary, the environmental information corresponding to a time when the detachable element is detached from the mobile electronic device is recorded, and the environmental information is used to determine whether the user forgets to put back the detachable element to the mobile electronic device for a long time, and/or whether the mobile electronic device is taken away from the location where the detachable element is detached and the detachable element is still not put back to the mobile electronic device. If yes, the user is reminded. In this way, a chance that the user forgets to put back the detachable element to the mobile electronic device is decreased. Moreover, the user is assisted to recall a location where the detachable element is previously placed by displaying the previously recorded environmental information.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A prompt method for a detachable element, adapted to a mobile electronic device, wherein the detachable element is detachably connected to the mobile electronic device, the prompt method comprising:
   (a) recording environmental information when detecting that the detachable element is detached from the mobile electronic device, wherein the environmental information comprises location information of the mobile electronic device;
   (b) determining whether the mobile electronic device conforms to a prompt condition according to the environmental information; and
   (c) performing a prompt operation related to the detachable element when the mobile electronic device conforms to the prompt condition.

2. The prompt method for the detachable element as claimed in claim 1, wherein the step (b) comprises:
   determining whether a current location of the mobile electronic device exceeds a predetermined distance range according to the location information; and
   determining that the mobile electronic device conforms to the prompt condition when the current location of the mobile electronic device exceeds the predetermined distance range and the detachable element is not connected to the mobile electronic device.

3. The prompt method for the detachable element as claimed in claim 2, wherein the location information corresponds to one or a combination of global positioning system (GPS) positioning data, a wireless communication signal strength and calendar data of the mobile electronic device when the detachable element is detached from the mobile electronic device.

4. The prompt method for the detachable element as claimed in claim 1, wherein the environmental information further comprises time information, and the step (b) comprises:
   determining whether a time that the detachable element is not connected to the mobile electronic device reaches a time threshold according to the time information; and
   determining that the mobile electronic device conforms to the prompt condition when the time that the detachable element is not connected to the mobile electronic device reaches the time threshold.

5. The prompt method for the detachable element as claimed in claim 4, wherein the time information corresponds to one or a combination of a current time when the detachable element is detached from the mobile electronic device and calendar data.

6. The prompt method for the detachable element as claimed in claim 1, wherein the prompt operation comprises displaying a prompt frame to prompt that the detachable element is not connected to the mobile electronic device.

7. The prompt method for the detachable element as claimed in claim 1, wherein after the step (c), the method further comprises displaying the environmental information when a first type signal is received.

8. The prompt method for the detachable element as claimed in claim 1, wherein after the step (c), the method further comprises again performing the prompt operation after a specific time in accordance with a second type signal when the second type signal is received.

9. The prompt method for the detachable element as claimed in claim 1, further comprising:
   obtaining a multimedia input to serve as the environmental information when detecting that the detachable element is detached from the mobile electronic device.

10. A mobile electronic device, using a detachable element, and comprising:
   a connection unit, wherein the detachable element is detachably connected to the mobile electronic device through the connection unit;
   a detection module, coupled to the connection unit, and detecting whether the detachable element is detached from the mobile electronic device; and
   a processing module, coupled to the detection module, wherein when the detection module detects that the detachable element is detached from the mobile electronic device, the processing module records environmental information, and determines whether the mobile electronic device conforms to a prompt condition according to the environmental information, wherein the environmental information comprises location information of the mobile electronic device,
   wherein when the mobile electronic device conforms to the prompt condition, the processing module performs a prompt operation related to the detachable element.

11. The mobile electronic device as claimed in claim 10, wherein the processing module determines whether a current location of the mobile electronic device exceeds a predetermined distance range according to the location information, and when the current location of the mobile electronic device exceeds the predetermined distance range and the detachable element is not connected to the mobile electronic device, the processing module determines that the mobile electronic device conforms to the prompt condition,
   wherein the environmental information further comprises time information, and the processing module further determines whether a time that the detachable element is not connected to the mobile electronic device reaches a time threshold according to the time information, and when the time that the detachable element is not connected to the mobile electronic device reaches the time threshold, the processing module determines that the mobile electronic device conforms to the prompt condition.

12. The mobile electronic device as claimed in claim 11, further comprising:
   a global positioning system (GPS) module, coupled to the processing module,
   wherein the processing module obtains GPS positioning data of the mobile electronic device through the GPS module when the detection module detects that the detachable element is detached from the mobile electronic device, and records the location information according to the GPS positioning data.

13. The mobile electronic device as claimed in claim 11, further comprising:
   a wireless communication module, coupled to the processing module,
   wherein the processing module obtains a wireless communication signal strength through the wireless communication module when the detection module detects that the detachable element is detached from the mobile electronic device, and records the location information according to the wireless communication signal strength.

14. The mobile electronic device as claimed in claim 11, further comprising:
   a storage unit, coupled to the processing module,
   wherein the processing module obtains calendar data from the storage unit when the detection module detects that the detachable element is detached from the mobile electronic device, and records the location information and the time information according to the calendar data.

15. The mobile electronic device as claimed in claim 11, further comprising:
   a time module, coupled to the processing module,
   wherein the processing module obtains a current time through the time module when the detection module detects that the detachable element is detached from the mobile electronic device, and records the time information according to the current time.

16. The mobile electronic device as claimed in claim 10, further comprising:
   a display unit, coupled to the processing module,
   wherein the processing module controls the display module to display a prompt frame to prompt that the detachable element is not connected to the mobile electronic device.

17. The mobile electronic device as claimed in claim 16, wherein after the processing module performs the prompt operation related to the detachable element, the processing module controls the display unit to display the environmental information when receiving a first type signal.

18. The mobile electronic device as claimed in claim 10, wherein after the processing module performs the prompt operation related to the detachable element, when the processing module receives a second type signal, the processing module again performs the prompt operation after a specific time in accordance with the second type signal.

19. The mobile electronic device as claimed in claim 10, further comprising:

a multimedia module, coupled to the processing module,
wherein the processing module obtains a multimedia input through the multimedia module to serve as the environmental information when the detection module detects that the detachable element is detached from the mobile electronic device.

20. A non-transitory computer-readable medium, recording at least one program instruction, and the at least one program instruction being loaded into a mobile electronic device using a detachable element to execute following steps:

recording environmental information when detecting that the detachable element is detached from the mobile electronic device, wherein the environmental information comprises location information of the mobile electronic device;

determining whether the mobile electronic device conforms to a prompt condition according to the environmental information; and performing a prompt operation related to the detachable element when the mobile electronic device conforms to the prompt condition.

\* \* \* \* \*